US006292751B1

(12) United States Patent
Frank

(10) Patent No.: US 6,292,751 B1
(45) Date of Patent: Sep. 18, 2001

(54) POSITIONING REFINEMENT ALGORITHM

(75) Inventor: Mark Frank, Austin, TX (US)

(73) Assignee: BAE Systems, Austin, TX (US)

( * ) Notice: Subject to any disclaimer, the term of this patent is extended or adjusted under 35 U.S.C. 154(b) by 0 days.

(21) Appl. No.: 09/500,274

(22) Filed: Feb. 8, 2000

(51) Int. Cl.$^7$ .................................................. G21G 1/06
(52) U.S. Cl. ............................................ 701/220; 701/221
(58) Field of Search ................................... 701/207, 202, 701/221, 220; 702/150, 87

(56) References Cited

U.S. PATENT DOCUMENTS

| 5,331,578 | 7/1994 | Stieler | 364/571.01 |
| 5,524,524 | 6/1996 | Richards et al. | 89/1.13 |
| 5,736,923 | * 4/1998 | Saab | 340/429 |
| 5,789,671 | * 8/1998 | Fernandez | 73/180 |
| 5,890,093 | 3/1999 | Mark et al. | 701/220 |
| 5,941,935 | 8/1999 | Fernandez | 701/220 |
| 6,026,135 | * 2/2000 | McFee et al. | 376/159 |

* cited by examiner

Primary Examiner—William A. Cuchlinski, Jr.
Assistant Examiner—Marthe Marc-Coleman
(74) Attorney, Agent, or Firm—Fulbright & Jaworski

(57) ABSTRACT

A method is provided for correcting errors in position derived from an inertial measurement unit (IMU), by performing a first zero velocity update at a time when the IMU is at rest, recording the time and position of the IMU at a subsequent start of a period of interest after the first zero velocity update, recording the time and position of the IMU at the end of the period of interest, performing a second zero velocity update at the end of the period of interest with the IMU at rest, and then recording a velocity indicated from the IMU, and deriving an accumulated error in position from the recorded data, by approximating errors in velocity by a function of time with a parameter determined from the recorded indicated velocity, and integrating the function over the period of interest to determine the accumulated error in position during the period of interest.

12 Claims, 2 Drawing Sheets

POSITIONING REFINEMENT ALGORITHM

TECHNICAL FIELD OF THE INVENTION

This invention relates to methods and apparatus for correcting errors associated with the use of an inertial measurement unit (IMU) to track positions, locations, or movements.

BACKGROUND OF THE INVENTION

Inertial Measurement Units (IMUs) typically use accelerometers and gyros to track accelerations in order to calculate changes in position. Because of inherent errors in the sensors used in IMUs, random errors in the calculated position build with time. One current method of eliminating these errors is to use a second position sensor (e.g., a GPS or an odometer input) along with a Kalman filter to minimize errors from each of the position sensors. A second method is to stop and perform a Zero Velocity Update (ZVU) to re-calibrate the sensors at the beginning of a period of interest.

Most applications using IMUs require good absolute position accuracy over long distances, such as for use in a plane or a tank. Such applications are ideal for use of an IMU coupled with a secondary data source such as a Global Positioning System (GPS) to bound and correct errors in the IMU. A typical IMU operating in conjunction with the GPS may be capable of 10 meters in accuracy relative to a fixed reference point after traversing a distance of 100 miles.

In contrast, some applications, such as to which this invention applies, requires extremely accurate relative position data over short distances. In such applications, it is necessary to determine with high accuracy how far the IMU has moved since the last ZVU was performed.

Neither of the two methods described above are suitable when very high relative positional accuracy is required over very short distances. For example, where a vehicle is used to detect and destroy a land mine, 3 centimeters of accuracy in 6 meters of travel is required. These high levels of accuracy preclude the use of coarse sensors such as an odometer or GPS to eliminate the errors. The nature of these applications also prevents a ZVU from being performed at the beginning of each period of interest (i.e., sensing of a mine or false alarm). Other solutions to the problem of accumulation of errors from an IMU include the use of more expensive sensors with lower noise, and using additional external equipment. As an example, survey quality differential Real Time Kinematic (RTK) GPS can provide highly accurate positional data with the use of a ground based station at a known point, which is disadvantageous in some situations. Thus, to achieve the requisite high levels of accuracy would generally require an IMU using extremely accurate sensors costing approximately $100,000. Therefore, there is a need for methods and apparatus for generating highly accurate position data over short periods of travel using a less expensive IMU.

SUMMARY OF THE INVENTION

An object of the present invention is, therefore, to provide methods and apparatus for generating highly accurate position data over short periods of travel using a relatively inexpensive IMU. This invention utilizes a method of estimating the random velocity errors in order to remove a portion of these errors from the position data.

The invention allows the use of a relatively inexpensive IMU by providing a method of estimating the accumulated error at the beginning and end of the period of interest, and then correcting for these errors. The method employs a ZVU at the end of the period of interest and uses a simple algorithm along with existing data from the IMU to correct for the accumulated errors and thereby provide more accurate position data.

The invention may be employed in a system for detecting and disabling mines as described herein, and may also be used to refine the accuracy of position determination in other applications as well.

The present invention provides several key advantages: (1) it provides highly accurate relative position data over short distances; (2) does not require external or ground-based equipment; (3) does not require stopping for calibration at the beginning of the period of interest; (4) does not require stopping for any length of time to gather data; (5) does not require the use of a second data source; and (6) allows the use of less expensive inertial sensors.

According to the present invention, a conventional IMU is provided for obtaining relative position data. A Zero Velocity Update (ZVU) is performed prior to the commencement of motion to calibrate the IMU. At some time after the commencement of motion a period of interest begins. At the start of the period of interest, the time and position of the IMU is recorded. At a later time, the period of interest ends. At the end of the period of interest, the motion of the IMU is stopped and the time and position of the IMU is again recorded. The velocity indicated by the IMU at the end of the period of interest is also recorded. Because the IMU is now at rest, any velocity indicated by the IMU is the result of errors accumulated during the time of motion of the IMU. The accumulation of error as a function of time is approximated by a function, f(t). From this function, the approximate amount of error at both the beginning and the end of the period of interest can be calculated. This error can then be subtracted from the position data for both the beginning and ending points of interest to minimize the error in the indicated relative change in position between these points.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
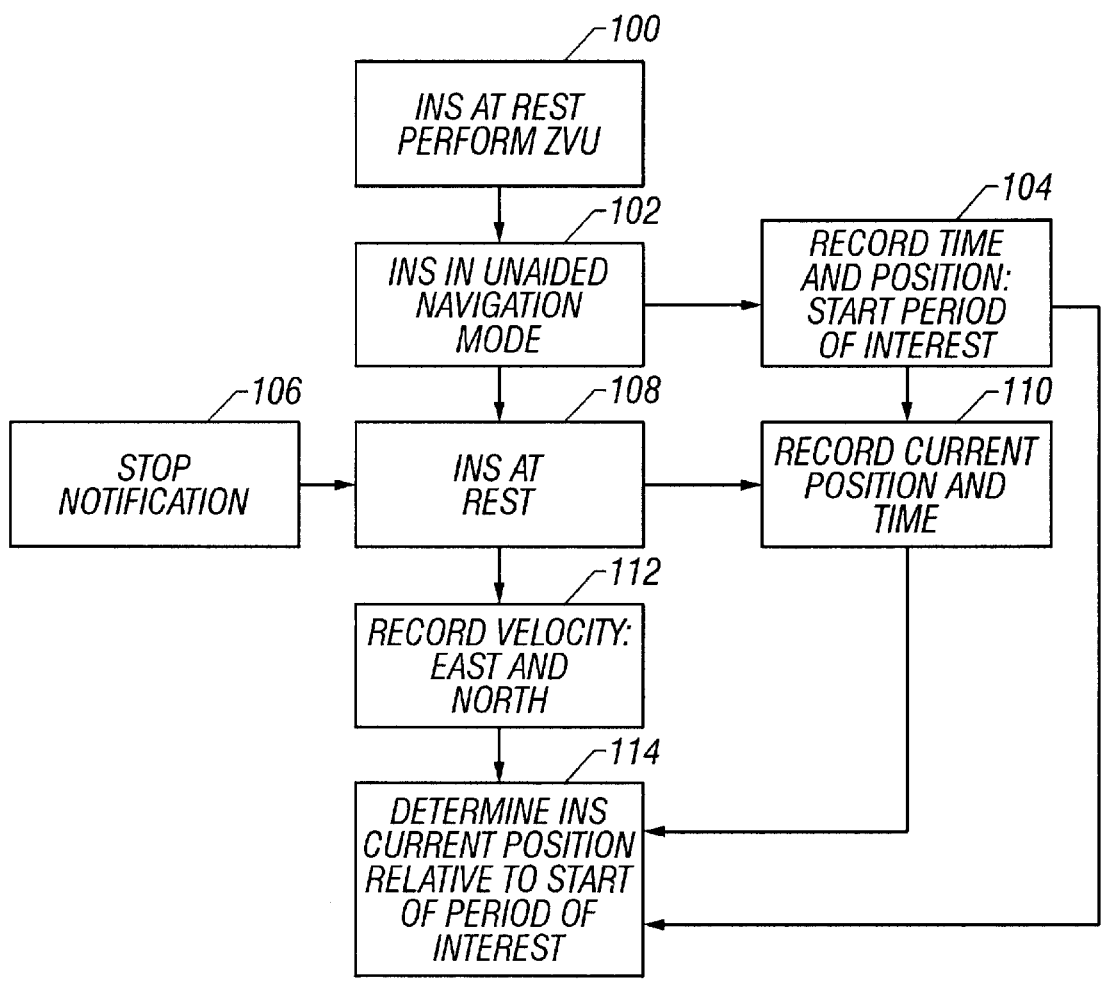
FIG. 1 is a flow chart of steps for implementing a method of the present invention.

An operational flow chart of steps for implementing the methods of the present invention is shown in FIG. 1. Initially, an inertial navigation system (INS), which incorporates a conventional IMU, is at rest, 100. A ZVU is performed prior to commencement of motion of the INS to calibrate the IMU, 100. Motion of the INS then commences and the INS operates in an unaided navigation mode, 102. At some time after the commencement of motion a period of interest begins. At the start of the period of interest, the time and position of the INS is recorded, 104. At a later time, the period of interest ends. At this time, the INS receives a stop notification 106 and comes to rest, 108, and the time and position of the INS is recorded, 100. The velocity along two horizontal axes, say north and east, is then recorded, 112. Because the IMU is at rest, any velocity indicated by the IMU is the result of errors accumulated during the time of motion of the IMU. With the information now obtained, an accurate determination of the position of the INS relative to its position at the start of the period of interest can be made 114.

The IMU produces measurements of acceleration over time which may be integrated once to produce a velocity history and twice to produce an indication of position. However, the accelerometer output of the IMU contains errors which are random in nature. Since velocity and position are obtained from integration of the IMU ouput, velocity and position errors accumulate over time. In the present invention, the velocity errors are approximated by a function with parameters that can be determined by evaluating the function at two instances of time: at an initial time when the IMU is at rest and the function is set equal to zero, and at the end of the period of interest when the function is set equal to the velocity recorded after the ZVU is performed when the IMU is at rest. Once the function is determined, it can be integrated over the period of interest to determine the error in position that has accumulated during the period of interest.

Figure 2:
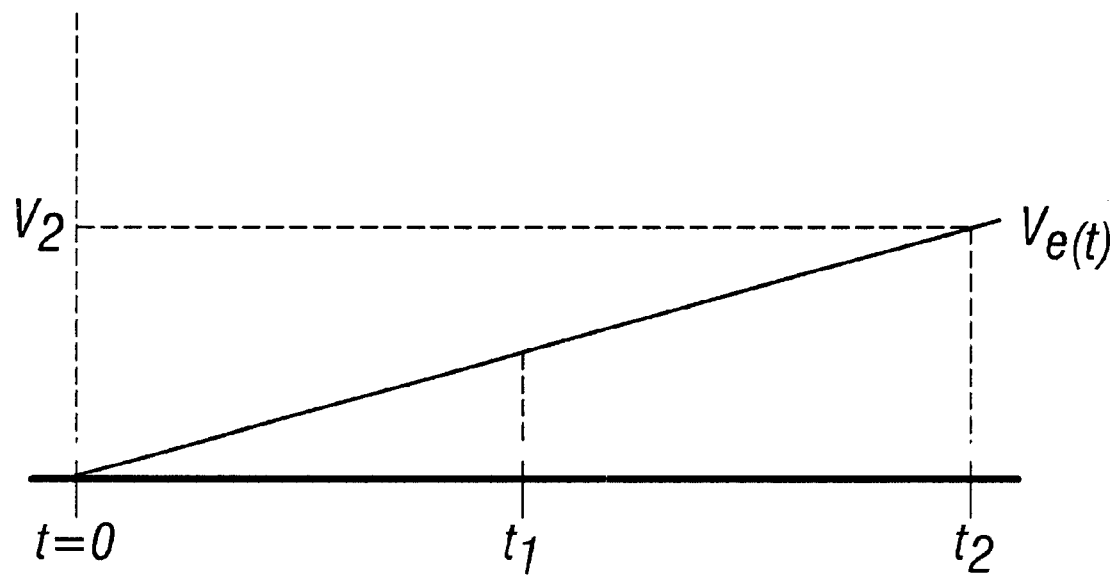
FIG. 2 shows a plot of velocity error as a function of time.

For example, if the accelerometer bias is constant, the velocity error will grow linearly with time, while position error grows as the square of time. FIG. 2 shows velocity error as a function of time, assuming a constant bias in the accelerometer output:

$$V_e(t) = \int a_e dt = a_e t + b$$

where $V_e(t)$ is the velocity error and $a_e$ is the constant acceleration error, and b is some initial velocity error. At time, t=0, $V_e(t)$ is zero because a ZVU was performed with the INS at rest. This yields b=0. At a later time, $t_1$, when a period of interest begins, the time, $t_1$, and an indicated position, $P_1$, is recorded. At a still later time, $t_2$, the period of interest ends, and the time, $t_2$, and position $P_2$, is recorded. The INS is stopped and the velocity $V_2$, is recorded. Since the actual velocity of the INS is zero, $V_2$, is equal to the velocity error, $V_e(t_2)$, at time, $t_2$:

$$V_e(t_2) = a_e t_2 = V_2$$

From this equation we can determine the constant acceleration error, $a_e = V_2/t_2$. The position error can now be determined by integrating the function for velocity error over the period of interest:

$$\Delta P_e = V_2 \int_{t_1}^{t_2} t\, dt = \frac{V_2}{2}(t_2^2 - t_1^2)$$

where $\Delta P_e$ is the position error that accumulated from the beginning of the period of interest to the end of the period of interest.

The indicated position, $P_2$, at time, $t_2$, is given by:

$$P_2 = P_a(t_2) + \frac{V_2 t_2^2}{2}$$

where $P_a(t_2)$ is the actual position of the INS at the end of the period of interest relative to its position at time t=0. Since $P_2$, $t_2$ and $V_2$ are known, $P_a(t_2)$ can be calculated directly as:

$$P_a(t_2) = P_2 - V_2 \frac{t_2^2}{2}$$

Similarly, the actual position of the INS at the beginning of the period of interest relative to its position at time t=0 can also be calculated:

$$P_a(t_1) = P_1 - \frac{V_2 t_1^2}{2}$$

Thus, the actual change in position during the period of interest is:

$$\Delta P_a = P_a(t_2) - P_a(t_1) = (P_2 - P_1) - \frac{V_2}{2}(t_2^2 - t_1^2)$$

Although the velocity error was approximated by a straight line in this example, a person of ordinary skill in the art will recognize that other suitable functions for approximating velocity error may be employed in accordance with the method of the invention as herein disclosed.

The calculation of position errors is performed for each orthogonal direction for which motion may take place. For example, if the motion of the IMU is in a plane, position error is calculated for each of the two orthogonal axes that define the plane of motion.

The method of the present invention may be implemented by providing a computer processor for performing the computations and logical decisions required to implement the method for correcting position errors described herein. Programming the processor to implement the method is a relatively simple task for a person of ordinary skill in the art.

The method of the present invention described herein may be employed in a mine hunter-killer system. Such a system utilizes a vehicle upon which is mounted an INS comprising an IMU and a processor for deriving errors in position from recorded data obtained in accordance with the method herein described. Initially, the vehicle is at rest and a ZVU is performed on the IMU. The vehicle then commences motion. A period of interest begins when the vehicle detects a mine just in front of the vehicle and records its position relative to the vehicle. At that moment, the time and position of the vehicle is recorded. The vehicle then stops with the mine behind the vehicle and in close proximity thereto, so that the mine may be reached by a robotic arm. At that moment, the time and position is again recorded and a ZVU is performed. From this data the precise position of the mine relative to the vehicle can be accurately determined. Using this accurate position data, a robotic arm places a neutralizer atop the mine for later remote detonation.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method for correcting errors in position derived from an inertial measurement unit (IMU), comprising the steps of:
    performing a first zero velocity update at a time when the IMU is at rest;
    recording the time and position of the IMU at a subsequent start of a period of interest after the first zero velocity update;
    recording the time and position of the IMU at the end of the period of interest;
    performing a second zero velocity update at the end of the period of interest with the IMU at rest, and then recording a velocity indicated from the IMU; and
    deriving an accumulated error in position the deriving comprising a) approximating errors in velocity by a function of time with a parameter determined from the recorded indicated velocity, and b) integrating the function over the period of interest to determine the accumulated error in position during the period of interest.

2. The method of claim 1, wherein the function is a straight line with a slope proportional to the magnitude of the recorded indicated velocity.

3. The method of claim 1, where the IMU is mounted upon a vehicle for detecting mines and where the period of interest begins when a mine is detected and ends when the vehicle is positioned such that the mine is behind the vehicle and in close proximity thereto.

4. The method of claim 1, wherein a parameter of the function is determined by setting the function equal to the recorded indicated velocity and setting the time equal to the end of the period of interest.

5. The method of claim 1, further comprising the step of providing a computer processor for performing the step of deriving the accumulated error in position.

6. A method for determining the position of a mine relative to a vehicle upon which is mounted an inertial measurement unit (IMU), comprising the steps of:
    performing a first zero velocity update at a time when the vehicle is at rest;
    recording the time and position of the vehicle at a subsequent start of a period of interest after the first zero velocity update, wherein the start of the period of interest is triggered by the detection of a mine;
    recording the time and position of the vehicle at the end of the period of interest, wherein the end of the period of interest is triggered by the positioning of the vehicle such that the mine is behind the vehicle and in close proximity thereto;
    performing a zero velocity update at the end of the period of interest with the vehicle at rest, and then recording a velocity indicated from the IMU; and
    deriving an accumulated error in position the deriving comprising a) approximating errors in velocity by a function of time with a parameter determined from the recorded indicated velocity, and b) integrating the function over the period of interest to determine the accumulated error in position during the period of interest.

7. The method of claim 6, wherein the function is a straight line with a slope proportional to the magnitude of the recorded indicated velocity.

8. The method of claim 6, wherein a parameter of the function is determined by setting the function equal to the recorded indicated velocity and setting the time equal to the end of the period of interest.

9. The method of claim 6, further comprising the step of providing a computer processor for deriving the accumulated error in position.

10. A method for correcting errors in position derived from an inertial measurement unit (IMU), comprising the steps of:
    performing a first zero velocity update at a time when the IMU is at rest;
    recording the time, $t_1$, and position, $P_1$, of the IMU at a subsequent start of a period of interest after the first zero velocity update;
    recording the time, $t_2$ and position, $P_2$, of the IMU at the end of the period of interest;
    performing a second zero velocity update at the end of the period of interest with the IMU at rest, and then recording a velocity, $V_2$, indicated from the IMU; and
    deriving an accumulated error in position, $\Delta P_e$, according to the following formula:

$$\Delta P_e = \frac{V_2}{2}(t_2^2 - t_1^2).$$

11. The method of claim 10, further comprising the step of computing a change in position, $\Delta P_a$, of the IMU according to the following formula:

$$\Delta P_a = (P_2 - P_1) - \Delta P_e.$$

12. A mine detection vehicle for determining the position of a mine, comprising:
    an inertial navigation system (INS) comprising an inertial measurement unit (IMU) mounted upon said vehicle;
    a processor for determining errors in position derived from said IMU by processing recorded data obtained according to the following steps:
    (1) performing a first zero velocity update at a time when the IMU is at rest;
    (2) recording the time and position of the IMU at a subsequent start of a period of interest after the first zero velocity update;
    (3) recording the time and position of the IMU at the end of the period of interest;
    (4) performing a second zero velocity update at the end of the period of interest with the IMU at rest, and then recording a velocity indicated from the IMU, and
    (5) deriving an accumulated error in position the deriving comprising a) approximating errors in velocity by a function of time with a parameter determined from the recorded indicated velocity, and b) integrating the function over the period of interest to determine the accumulated error in position during the period of interest.

* * * * *

UNITED STATES PATENT AND TRADEMARK OFFICE
CERTIFICATE OF CORRECTION

| | |
|---|---|
| PATENT NO. | : 6,292,751 B1 |
| APPLICATION NO. | : 09/500274 |
| DATED | : September 18, 2001 |
| INVENTOR(S) | : Mark Frank |

It is certified that error appears in the above-identified patent and that said Letters Patent is hereby corrected as shown below:

In column 1, line 3, insert
--STATEMENT OF GOVERNMENT INTEREST

This invention was made with Government support under the Department of the Navy; contract number DAAB07-98-C-6027. The Government has certain rights in this invention.--.

Signed and Sealed this

Twenty-eighth Day of October, 2008

JON W. DUDAS
*Director of the United States Patent and Trademark Office*